Figure 3:
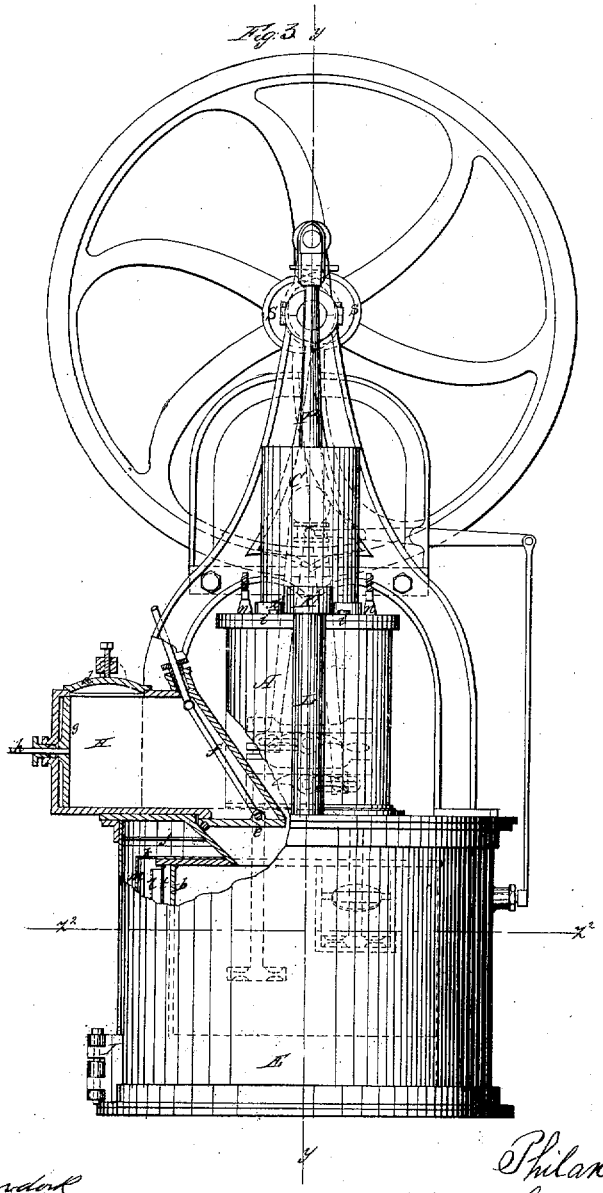

3 Sheets—Sheet 1.
P. SHAW.
HOT AIR ENGINE.
No. 3,313. Reissued Feb. 23, 1869.
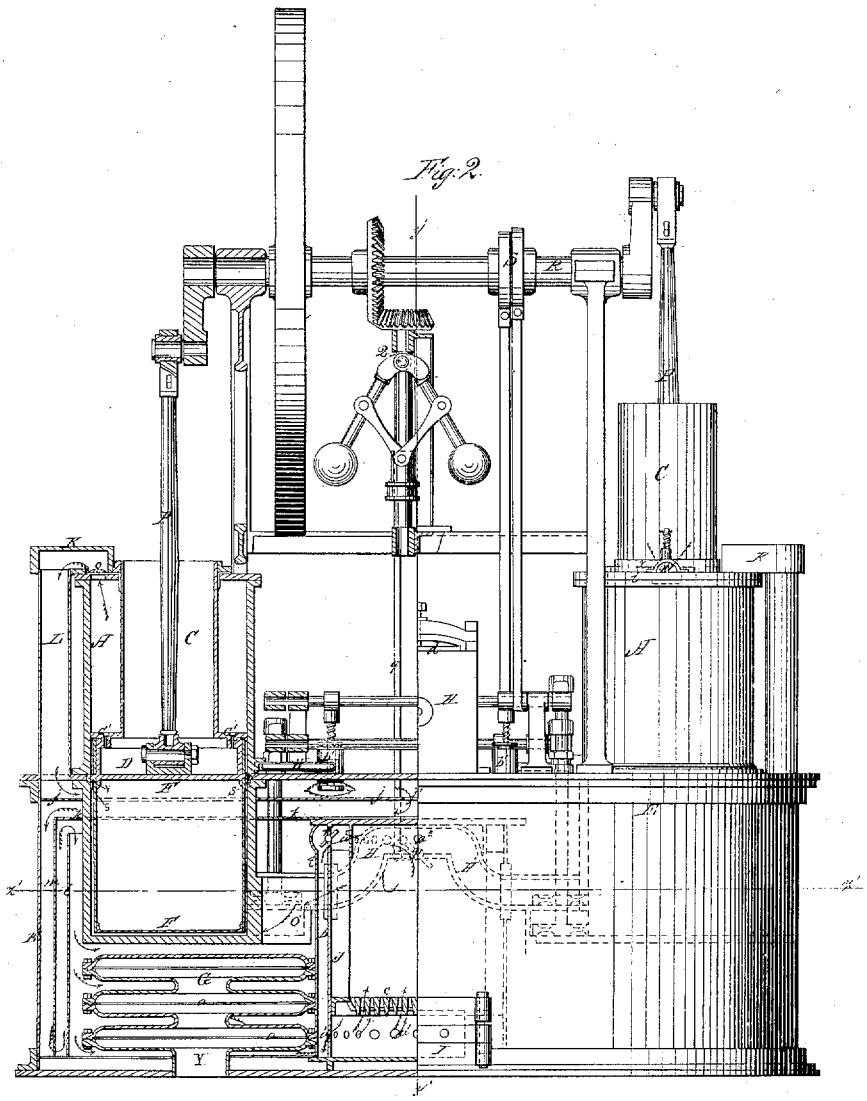
Witnesses:
Albert L. Mundell
William Cutson
Inventor:
Philander Shaw
Noble Harris, Treasurer assignee
THE NORRIS PETERS CO., PHOTO-LITHO., WASHINGTON, D. C.

3 Sheets—Sheet 2.

P. SHAW.

HOT AIR ENGINE.

No. 3,313. Reissued Feb. 23, 1869.

Witnesses:

Albert L. Murdock

William Mason

Inventor:

Philander Shaw

Nathan Harris Pres. of Assignee

THE NORRIS PETERS CO., PHOTO-LITHO., WASHINGTON, D. C.

P. SHAW.

HOT AIR ENGINE.

No. 3,313. Reissued Feb. 23, 1869.

Witnesses:

Albert L. Murdock
William Edson

Inventor:

Philander Shaw
Nathan Harris Priddy & Co.

THE NORRIS PETERS CO., PHOTO-LITHO., WASHINGTON, D. C.

United States Patent Office.

SHAW'S UNION AIR-ENGINE COMPANY, ~~OF BROOKLINE, MASSACHUSETTS~~, ASSIGNEES OF PHILANDER SHAW.

*Letters Patent No.* 33,799, *dated November* 26, 1861; *reissue No.* 3,313, *dated February* 23, 1869.

IMPROVEMENT IN HOT-AIR ENGINES.

The Schedule referred to in these Letters Patent and making part of the same.

*To ~~all whom it may~~ concern:*

Be it known that I, PHILANDER SHAW, of Boston, in the county of Suffolk, and State of Massachusetts, have invented certain new and useful Improvements in Hot-Air, or Caloric Engines; and I do hereby declare that the following, taken in connection with the drawings which accompany and form part of this specification, is a description of my invention, so full and exact as to enable those skilled in the art to practise it.

The nature of my invention consists—

First, in an arrangement, substantially such as herein is described, and is also illustrated in the drawings, of two single-acting cylinders, having their pistons coupled to a shaft, having its cranks at right angles with each other, with a furnace, and its accessories, centrally located, or nearly so, between the said cylinders, and within an air-tight casing, which forms a reservoir for compressed and heated air, and is so divided, by partitions and diaphragms, as to receive the cool-supply air at or near the exterior of the reservoir, and to guide it inward, by a tortuous passage, to the furnace, in substantially the manner described, so that it shall absorb the heat radiated from such parts of the engine as receive the products of combustion, those parts of the engine cylinders, in which the pistons fill the bore, being located outside of and upon the casing as a foundation, and exposed to the atmosphere, and the other parts of the cylinders being located within the casing, so that the heat radiated therefrom shall be absorbed by the cool-supply air on its route to the furnace.

Second, in a peculiar construction and arrangement, substantially such as herein is described, and is illustrated in the drawings, of the hot-air cylinder, the packed part of its piston, and a piston-trunk, which, with the necessary packing-valves and other adjuncts, form a pump by which cold air is compressed and supplied to the furnace, to be expanded by heat. The pump, being annular, is exposed, inside as well as outside, to the cooling-influence of the atmosphere, and, when compressing the supply-air, being operated by the direct pressure of the expanded heated air on the engine-piston, the strain necessary to compress the supply-air is applied directly, and is not transmitted through the rotative parts of the mechanism. By this annular arrangement of the pump, I am enabled to reduce the height which would otherwise be needed by my engine, by connecting the pitman direct to the engine-piston. The pitman thus vibrates within the trunk, and good facilities are had for keeping cool the joint of the pitman with the piston, and for lubricating it.

Figure 6:
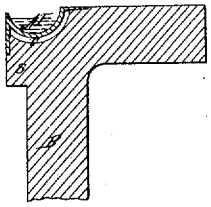

Third, in a construction of the cylinders, substantially such as herein described, and is illustrated in the drawings, and more particularly detailed on Sheet No. 4, fig. 6, which consists in a groove or chamber, formed around the interior of the cylinder, at the part thereof where the lower edge of the closely-fitting portion of the piston comes at the lowest point in its downward stroke. This chamber receives a supply of pure, cool, compressed air, by means hereinafter described, for the purpose of keeping the piston-packing cool, and that part of the interior surface of the cylinder against which the piston slides, and to keep solid products of combustion from rising to the upper part of the cylinder with each incoming supply from the furnace. This chamber or groove also serves to receive the lubricating-fluid, which escapes past the packed portion of the piston, and as much more as may be introduced therein by means of "oil-pumps," &c. Into the fluid contained in this groove, the lower edge of the piston may be made to dip, and so lubricate the inner surface of the cylinder at each stroke of the piston. The groove or chamber may be made to receive an isolated circular trough to receive the oil, as shown in fig. 6, which, by means of the introduction of cool, compressed, and pure air around it, prevents evaporation of the oil by conducted heat, which might occur without the use of the isolated trough.

Fourth, in the construction of an inwardly-projecting flange, as shown and described, which flange may form part of the boundary of the circular chamber before referred to, and which comes nearly, but not quite into contact with the contracted and extended part of the piston, for the purpose of deflecting such solid matter from the furnace, as may find entrance into the cylinder along with the gaseous products of combustion, and preventing the same from abrading the finished surfaces of the piston and cylinder.

Fifth, in the arrangement of an auxiliary valve, operating to admit, from the reservoir, in which the air is maintained under pressure, comparatively cool and compressed air into the circular groove around the cylinder, and into the clearance-spaces within and connected with the cylinder, for the double purpose of balancing the pressure upon the main inlet-valve into the cylinder, and to maintain the finished surfaces of the piston and cylinder, where one moves upon the other, at a temperature which will not prevent lubrication.

Sixth, in regulating the speed of hot-air engines, by placing a valve, which is operated by the regulator of the engine, so that it shall obstruct the passage of air on its way from the air-pump to the working-cylinder, and thus cause an additional resistance to the motion of the air-pump piston, said resistance continuing to act against the motion of the piston until the velocity of the engine is reduced to its normal rate. By the common method, that is, by regulating the speed of the engine by the exhaust-regulator, or, in other words, by diminishing or increasing the pressure, the power of the engine is reduced to the work actually being done, although the work may be but a tenth part of that which the engine is capable of doing. If, now, while the engine is thus working, the amount of work is suddenly thrown upon it, which will, perhaps, require most of its normal power, the effect will be to so check its velocity that it cannot recover its pressure, and thus stop it altogether. By my method, any increase in the speed of the engine will cause the regulating-valve to obstruct the passage of air from the pump to the cylinder, and give an additional resistance to the action of the pump, which serves to check the engine, while, at the same time, the pressure is kept at its normal point, thus leaving the engine always ready to act up to its normal capacity. It will be seen, that by my method, the engine may be even stopped for a moment, by the regulator-valve, and yet the pressure in the cylinders remains at its normal point, so that the engine is ready to start without having to wait to re-establish a working-pressure. The ordinary method of regulating the speed of an air-engine, by allowing the escape of the condensed air, and thus reducing the pressure, is objectional, on account of the loss of time which is consumed while the engine is working up to the required pressure. The common method will not check the speed of the engine, when work is thrown off, as quickly as mine will, for the reason that it simply reduces the pressure on the piston, while, by my method, I reduce the pressure on the piston, at the same time increasing that on the pump, thus acting in two ways to check the speed of the engine. Again, when work is thrown on, an engine, with my regulator, has already the necessary pressure, and it recovers its speed at once, but an engine with the common regulator, must have time to make up the pressure necessary to the work.

Seventh, in the construction and combination of the devices for cooling all the essential parts of the engine, by causing a circulation of the cool air from the air-pumps through and around the different parts of the engine.

The importance of this cooling-arrangement cannot be overstated, as, in fact, the whole practical value of an air-engine may be estimated, other things being equal, upon the relation between the temperature of its working-parts and the pressure generated; in other words, no air-engine can work steadily and economically, unless the working-parts are kept comparatively cool.

In my engine, the parts are arranged with this end in view, as will be seen, if we follow the course of the air from the air-pump to the furnace. Thus the air is taken into the air-pump through the valve *n*, Figure 2; thence sent through the pipe K L, Figure 1, into the chamber formed by the plates E and *j* around the central part of the cylinder, and near the oil-receptacle, *v*, thus keeping this most important part of the cylinder cool; thence, the air passes through an opening, *j'*, in the plate *j*, fig. 1, into the space between the plates *j* and *k*, fig. 1, and again around the cylinder, at a point just below its first passage, and again cools the cylinder. It then passes vertically downward between the outside case E and the lining *m*. It enters the space between *m* and *l*, thence over the top of the lining *l* into the space immediately surrounding the lower part of the cylinder and the casings of the valves N and V, Figure 3.

The cool air from the pump having thus traversed through and about all these parts, cooling on its passage the central and lower part of the cylinder, the valves and stems, and the casings, and in general all of the important parts of the engine, pass finally through the perforations in the plates *t* and *b*, fig. 1, into the furnace.

*Drawings.*

Sheet No. 1 illustrates in half-side elevation, and in half-sectional elevation, a hot-air, or caloric engine embodying my invention, the section being taken in the lines *y y*, Sheet No. 2, *z z*, Sheet No. 3.

Sheet No. 2 is an end elevation of the same, a part, however, being shown in section taken in the lines $y^1$ $y^1$, Sheet No. 1, and $x'$ $x'$, Sheet No. 3, for the purpose of showing the fuel feed-box.

Figure 3, Sheet No. 3, illustrates the same in half plan and in half horizontal section, taken in the lines $z^1$ $z^1$, Sheet No. 1, and $z^2$ $z^2$, Sheet No. 2.

Figure 5:
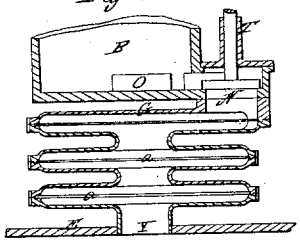
Figure 4:
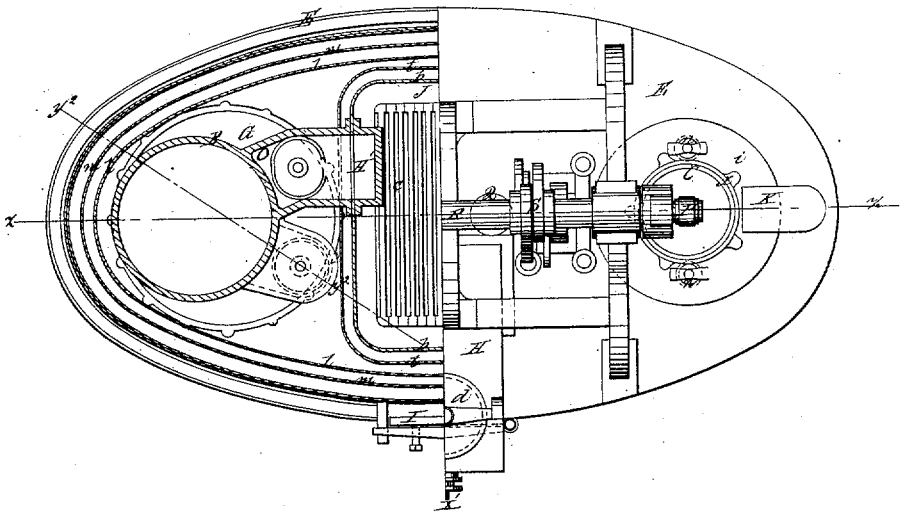

Figure 5 is a sectional elevation, taken in the line $y^2$ $y^2$, fig. 3, of so much of the cylinder, and the parts connected therewith, as to illustrate how the "exhaust" escapes into the radiator or heater.

Figure 6, an enlarged section, shows the groove or chamber in the cylinder, the isolated trough therein, and the inwardly-projecting flange.

E is the casing, which, as it forms the reservoir for the compressed air, and the foundation or bed-plate for the mechanism, should be so made as to be air-tight under the heat, strains, and pressure to which it is subjected, and wherever moving parts pass through it, they should be carefully packed.

Centrally located in E is the furnace, lined with fire-brick, J, figs. 1 and 3, and provided with grates, *c*, figs. 1 and 3, and an ash-pit, which has an air-tight door, I, figs. 2 and 3, and fuel-receptacle H, figs. 1, 2, and 3, from which fuel is fed to the fire through the top of the furnace.

The fuel-box is provided with an air-tight receiving-door, *d*, figs. 1, 2, and 3, having suitable fastenings, and a valve, *e*, fig. 2, opened and closed by a link, *f*, fig. 2, and a valve-rod, which passes through a packing in the fuel-box.

A piston-head, *g*, with its rod, *h*, (see fig. 2,) serves to thrust the fuel forward in the fuel-box, so that it may all fall into the furnace, through the aperture closed by valve *e*, fig. 2.

By this arrangement, and its proper manipulation, which will be seen by inspection of the drawings, it is obvious that the fire may be replenished with fresh fuel, while there is the requisite pressure within the furnace and casing, needed to operate the engine, without reducing the pressure or impeding the operation of the engine.

The furnace is provided with openings, $a^1$, fig. 1, below the grates, and with others, $a^2$, fig. 1, above the top of the fuel, through which air under pressure is supplied, by means hereinafter to be described, which air is introduced into the space contained between the outside casing *b*, figs. 1, 2, and 3, which next surrounds it.

The working-cylinders, of which there are two, are located within and upon the casing, and upon opposite sides of the furnace.

These cylinders are single-acting, that is, the piston of each is forced upward by admitting the compressed heated air and gases from within the furnace, beneath the piston; and both pistons being connected to the main shaft R, figs. 1 and 3, by cranks at right angles with each other, the downward movement of each piston is produced by the upward movement of the other, acting through the shaft in connection with the balance-wheel.

Each cylinder may be described as in two sections; the upper section A, figs. 1 and 2, standing above and outside of the casing or bed-plate, and being finished inside, so that a closely-fitting packed piston, D, fig. 1, may move freely therein, after the manner of steam-engine pistons within their cylinders. The lower section, B, figs. 3, 5, and 6, is within the bed-plate or casing. This section need not be bored out or finished, as the extension-part F, fig. 1, of the piston, which plays in the lower section of the cylinder, is not intended to come into contact with it, and, when at the lowest point of its downward stroke, leaves an end and an annular clearance.

That part of the piston which is marked D, fig. 1, is constructed nearly like steam-engine pistons, so far as packing is concerned, and does not need further explanation than is afforded by the drawing.

The piston-follower, *c'*, fig. 1, is the flange of the pipe or trunk, C, figs. 1, 2, and 3. In this trunk, the connecting-rod or pitman, P, figs. 1, 2, and 3, plays, and is connected to the piston-head by a joint, as shown in fig. 1, which is kept cool by free exposure to the atmosphere, and by lubrication, for which good facilities are afforded. The trunk passes through the upper head, *i*, figs. 1, 2, and 3, of the cylinder, where it is packed with leather, and guided by the gland *x*, figs. 1, 2, and 3.

The upper cylinder-head is furnished with a valve, *o*, fig. 1, which, when forced open by the compression of the air in the annular space between the trunk and the upper section of the cylinder, permits the said compressed air to pass into the casing, through the valve-box K and pipe L, figs. 1 and 2. It will be obvious that the piston, in its ascent, will compress the air in the said annular space, till its density is equal to that of the gaseous contents of the casing, when further movement of the piston upward, opens the outlet-valve and displaces the compressed air.

The upper cylinder-head is also furnished with valves, *n*, figs. 1, 2, and 3, the purpose of which is to open to admit air within the annular pump, when the piston descends, and to close, and remain closed at other times. Supposing the engine to be in motion, the air which is taken in by the pumps and thrown out by each stroke of each piston, passes, as is indicated by the arrows in fig. 1, along the division-plate *j*, fig. 1, which extends horizontally, entirely across the space contained within the casing, to an opening in the centre of said plate; then, between said plate and a second horizontal plate, *k*, figs. 1 and 2; from thence, downward between the outer vertical boundary E of the casing, and an internal vertical partition, *m m*, figs. 1 and 2, parallel with said outer boundary, and extending entirely around within the casing; then vertically upward between partitions *m* and *l*, figs. 1, 2, and 3, into a space contained between *l* and *t*, figs. 1, 2, and 3, whence the air passes into the furnace through apertures $a^1$, figs. 1 and 2, and $a^2$, fig. 1, the position of the dampers *r*, fig. 1, determining what portion of the air shall pass into the furnace through the fuel, and what above it.

Having described how air is compressed and forced into the furnace, I will now show how, when expanded by heat, it passes into the cylinders and is exhausted therefrom, thereby producing reciprocations of the pistons, and developing the power generated by heating the air.

In the top of the furnace, and passing through it to the inlet-valve boxes O, figs. 1, 3, and 5, is a suitably-shaped pipe, $H^1$, figs. 1 and 3, with an aperture therein, opening into the furnace, which can be opened and closed by a throttle-valve, *p*, fig. 1. This valve is operated by a governor or regulator, Q, figs. 1 and 3, operating on a lever fixed to the valve-stem, by means of the connection *q*, fig. 1. The heated air and gaseous products of combustion, mingled, pass into this pipe in amount regulated by the position of the throttle-valve, and when the inlet-valve of either cylinder is opened, they pass into the cylinder and force the piston upward. The inlet-valve, or valve corresponding to the steam-valve of a steam-engine, closes when or before the piston has completed its upward movement. At about the time when the upward movement of the piston ceases, and after the inlet-valve has been closed, the exhaust-valve opens and permits the contents of the cylinder to escape, and to be forced out, by the descent of the piston, into the open air, through the passage N, fig. 5, and the radiator or heater G, figs. 1, 3, and 5, located in the space through which air passes on its way to be heated in the furnace.

The valves shown in the drawings are of the puppet variety, and are operated, at proper times, by lifter-tappets on the valve-rods, and on rocker-shafts worked from eccentrics S, figs. 1, 2, and 3, on the main shaft. There is nothing peculiar about the valves or valve-gear, and any other which is adapted to the ingress and egress of the heated air, and known to engineers, in the practice of their profession, may be used for those shown, though I prefer to use valves of the puppet variety.

The form of the heater is immaterial. That shown, presents a large surface for radiation, and the diaphragm-plates *a*, figs. 1 and 5, within the heater, compel a tortuous passage of the exhaust.

It will be seen that the disposition of division-plates and partitions, before mentioned, is such as to cause the gradual heating of the cold, compressed air on its way from the pump to the furnace, by the absorption of the heat from the radiation from the lower part of the cylinder, the conveying-pipes, heater, and boundaries of the furnace, so that the radiated heat is nearly all utilized, and the desideratum is attained of having a comparatively cool surface to the outer, or exposed surface and parts of the machine. A dead-air space is formed in the casing, between its base-plate and the compressed and heated air, to prevent radiation of heat from the lower surface of the casing.

At the junction of the upper and lower sections of the cylinder, and at the lower edge of the close-fitting part of the piston, a groove or chamber, *v*, figs. 1 and 6, is formed entirely around the cylinder. At the upper inner edge of the lower section of the cylinder, is an inward-projecting flange, *s*, figs. 1 and 6, which forms the bottom of the groove, and extends inward, from the general surface of the lower part of the cylinder, so as almost to touch the lower, or extended part of the piston. The groove or chamber around the cylinder, communicates with the compressed air in the upper part of the casing, where it is comparatively cool and pure.

This communication is made by the means of pipe *w*, fig. 1, which terminates in the valve-box *b'*, fig. 1, which the puppet-valve *u*, fig. 1, operates by any suitable mechanism, that shown being a wiper or arm on a rocker-shaft, acting on the valve-stem, to open the valve against the pressure of a spring, the reaction of which assists to close it.

It will be seen that when the valve *u*, fig. 1, is open, air will flow into the cylinder from the casing at such spot as the valve may be located at. If this valve is opened, as it should be, after the exhaust-valve closes, and before the main inlet opens, all the clearances or unoccupied space in the cylinder and valve-passages will be filled with pure air, but little heated, and of density equal to that within the casing and furnace.

The object of introducing air through pipe *w*, fig. 1, from and at about the place, and at the time mentioned, is threefold:

First, by rendering the pressure alike on both sides of the inlet-valve, it is balanced, and operated *in equilibrio*, by which the power necessary to work it is reduced to the minimum.

Second, by having the spaces in the cylinders filled with pure air, that which rushes, afterward, into the cylinder from the furnace, will not be apt to carry the solid products of combustion into the joint between the finished portions of the piston and cylinder.

Third, by the introduction of cool compressed air, as described, the temperature of the finished parts of the piston and cylinder, which come into contact, are kept sufficiently cool to admit of efficient lubrication. The inwardly-projecting flange *s*, figs. 1 and 6, serves to deflect or to render difficult the passage of any particle of solid matter coming into the cylinder with the heated air and gaseous products of combustion, and the lower edge of the packed part of the piston is made of the shape shown in fig. 1, to aid in keeping solid matter from entering between the finished surfaces of the piston and cylinder, and from abrading them.

The chamber *v*, figs. 1 and 6, serves to catch the oil which passes by the piston, or lubricating-matter may be injected therein, by an oil-pump. A pipe provided with a stop-cock, will afford means for drawing off accumulations of lubricating-matter, together with such solid matter as may be deposited there, while the lower edge of the piston-packing, by dripping into the oil at each downward stroke, will aid in keeping the working-surfaces well lubricated.

An improvement upon the simple chamber, consists in placing therein a circular oil-trough, M, (see fig. 6,) which is sustained, at a little distance from the metal of the cylinder, by ears placed at intervals around the trough.

The current of cool air from the auxiliary valve, will pass through the space around the trough, cutting off communication of the heat conducted by the metal of the cylinder, and preventing evaporation, and burning of the lubricating-material.

In starting a fire on the grates, the main inlet, exhaust, and throttle-valves should be opened, as well as the ash-pit door, to establish a draught through the engine by way of the cylinder and radiator. If sufficient draught cannot be obtained in this way, then the fuel-box valve *e*, fig. 2, and the door *d*, figs. 1, 2, and 3, should be opened, and a direct upward draught thereby established, which may be conducted by a temporary funnel.

When the fuel is well ignited, all the doors and valves through which air can pass to or from the casing, should be closed and secured, and air should be supplied by a pump to support combustion, and to force and compress air within the casing, where it will be expanded from the heat generated by the burning fuel.

The means by which air may be forced into the furnace, while establishing a sufficient pressure therein to start the engine, may be a force-pump, or fan, or other equivalent device, operated by hand, or by any other convenient and suitable power; or, the main shaft of the engine itself may be rotated by suitable means, when the pump forming part of the engine will supply the air needed in the furnace.

When sufficient pressure has been generated to rotate the engine, the extraneous force may be discontinued, as the expansion of the air supplied by the pumps of the engine will continue to increase the pressure within the casing, till the engine has some work applied to it, to absorb the power generated.

A safety-valve may be applied to the casing, and so regulated as to prevent the increase of pressure to a point which would endanger the integrity of the machine.

It should be observed that the valve-chest covers, through which pass the valve-stems, are provided with pipes T, fig. 5, which extend through the casing, for the purpose of bringing the packings of the valve-stems to a position where they are not materially affected by the heat from the furnace.

Having described my invention,

What I claim as new, and desire to have secured to me by Letters Patent, is—

1. The combination and arrangement of the cylinders, pistons, reservoir, and furnace, substantially as herein made known.

2. The combination of the finished or upper part of the cylinder, with its head, piston, and trunk, therewith connected, all operating together, and with inlet and outlet-valves, and suitable packing round the said trunk, to form an annular air-pump, substantially as set forth.

3. The combination and arrangement of the chamber or groove *v* around the cylinder, substantially as specified.

4. The construction and arrangement of the oil-trough M, within the chamber or groove, around and within the cylinder, as herein set forth.

5. The inwardly-projecting flange *s*, constructed, combined, and arranged substantially as shown and described.

6. The combination and arrangement of the valve *u*, valve-box *b'*, and air-passage *w*, whereby to admit comparatively pure and cool air from the reservoir, in which it is constantly maintained compressed, at the place and times, substantially upon the principle herein made known.

7. In an air-engine, in which the products of combustion pass through the working-cylinder, the devices herein set forth, whereby to force the cool air from the air-pump around and through all parts of the engine liable to be overheated by the intense heat from the fire-pot, substantially as herein set forth.

8. The device and arrangement for sending the cool air from the air-pump around and against the valves, valve-boxes, and valve-stems, for the purpose of cooling them.

9. The combination of the valve *p* with the fire-chamber, hot-air passage H', and the regulating-device Q *q*, whereby to govern the speed of the engine, as herein set forth.

PHILANDER SHAW.

Witnesses:

WILLIAM EDSON,
ALBERT L. MURDOCK.